(12) United States Patent
Paterson

(10) Patent No.: US 6,662,756 B1
(45) Date of Patent: Dec. 16, 2003

(54) URINE COLLECTOR

(76) Inventor: Brian William Paterson, 34 Dendy Street, Brighton, Victoria 3186 (AU)

( * ) Notice: Subject to any disclaimer, the term of this patent is extended or adjusted under 35 U.S.C. 154(b) by 0 days.

(21) Appl. No.: 10/070,609

(22) PCT Filed: Sep. 8, 2000

(86) PCT No.: PCT/AU00/01080
§ 371 (c)(1),
(2), (4) Date: May 23, 2002

(87) PCT Pub. No.: WO01/19282
PCT Pub. Date: Mar. 22, 2001

(30) Foreign Application Priority Data

Sep. 10, 1999 (AU) ............................................... PQ2751
Feb. 15, 2000 (AU) ............................................... PQ5607

(51) Int. Cl.[7] .............................................. A01K 23/00
(52) U.S. Cl. ...................................... 119/869; 119/868
(58) Field of Search ................................ 119/869, 867, 119/868; 604/385.09; 600/573

(56) References Cited

U.S. PATENT DOCUMENTS

| 398,379 A | | 2/1889 | Cole | |
|---|---|---|---|---|
| 2,173,356 A | * | 9/1939 | Cross | 119/868 |
| 2,310,505 A | * | 2/1943 | Blackburn et al. | 119/869 |
| 2,519,743 A | * | 8/1950 | Cruise | 119/869 |
| 2,536,052 A | * | 1/1951 | Gohlike | 119/869 |
| 3,036,553 A | | 5/1962 | Gandier | |
| 3,270,714 A | | 9/1966 | Gandier | |
| 3,850,159 A | * | 11/1974 | Langley | 119/869 |
| 4,198,979 A | * | 4/1980 | Cooney et al. | 604/329 |
| 4,583,983 A | * | 4/1986 | Einhorn et al. | 604/329 |
| 4,893,587 A | * | 1/1990 | Bailey, Jr. | 119/869 |
| 4,936,838 A | * | 6/1990 | Cross et al. | 604/329 |
| 5,004,463 A | * | 4/1991 | Nigay | 604/329 |
| 5,738,047 A | * | 4/1998 | McNamara | 119/869 |
| 2002/0134319 A1 | * | 9/2002 | Frink | 119/869 |

FOREIGN PATENT DOCUMENTS

WO 95/13695 5/1995

* cited by examiner

*Primary Examiner*—Yvonne Abbott
(74) *Attorney, Agent, or Firm*—Larson & Taylor PLC

(57) ABSTRACT

The present invention provides a method and apparatus for collecting urine from a female quadruped, the apparatus comprising a urine collector having: a urine receptacle having a urine inlet for receiving urine; a support member for supporting the receptacle, the support member locatable to bridge the buttocks of the quadruped adjacent to and below the vulva thereof and generally conforming to the shape of the rump to thereby resist lateral displacement; wherein the receptacle is supported by the support member so that the urine inlet is proximate to and substantially surrounds the periphery of the urethra.

16 Claims, 13 Drawing Sheets

URINE COLLECTOR

The present invention relates to a urine collector for collecting the urine of female quadrupeds, of particular but by no means limited application for the collection of the urine of mares.

Devices for collecting, at the point of excretion, the faeces or urine of various animals have been used for some years for both sanitary purposes but also to facilitate the reuse of the excrement. This practice has become particularly significant owing to the recognition that this excrement may contain valuable components, such as hormones of value in the preparation of some pharmaceuticals. Urine, in particular, has proved to be a remarkably rich source of such hormones, which has prompted the development of urine collectors. This is a relatively straightforward matter for male animals but considerably more difficult for female animals, especially if the urine is to be kept free of faecal matter. As the urine of a pregnant mare, for example, has been found to have particularly valuable constituents, a number of known devices attempt to collect such urine as conveniently, efficiently and contaminant free as possible.

In their simplest form, a urine collector may comprise a simple receptacle located behind the animal, and relying on the force of urination to carry the urine to the receptacle. Faeces tend to be ejected less forcefully, so drop—in such collectors—between the animal and the urine collector. However, in some cases faecal matter may be ejected with such force that some faecal matter may reach the urine collector, even if the aperture of the urine collector is covered with a mesh to exclude large portions of faecal solids. Even if the faecal solids are stopped by such a mesh, the mesh will become contaminated such that urine subsequently directed towards the collector will become contaminated as it flows through the mesh and into the collector. In addition, faecal fluid emitted by the anus may run over the urethra during urination and thereby contaminating the urine stream.

U.S. Pat. No. 3,036,553 teaches a collector tube for urine and adaptor therefor, in which a vulva-encircling oval ring is held in position against the animal by means of a harness, with a fluid-tight bag attached to the oval ring in which accumulates the collected urine. The oval ring must form a strong contact with the animal between the vulva and the anus to exclude faecal matter. The harness, which engages the animal, also supports the fluid-tight bag. The oval ring, however, is of relatively rigid material and therefore is easily dislodged from its ideal position when the animal moves about a stable or paddock, or pushes its rump up against a tree or fence. Further, an oval ring of any particular size can be used with only a limited range of animals, as different animals differ in the size of their vulva, the distance between their buttocks, and the distance between the anus and vulva. Variation in the last distance, between anus and vulva, causes particular difficulties as the ability of this device to exclude faecal matter is highly dependent upon the correct locating of the device firmly against the perineum. As a result, leakage and rubbing may result if this device is used with a mare with a vulva at the upper or lower end of the mean vulva size. This problem may be overcome by custom-fitting each animal, but this adds expense to the manufacturing process and is undesirably time consuming.

There is also little resistance to the sideways movement of the device, which therefore readily becomes dislodged from its most effective position. Finally, even under ideal circumstances this device performs poorly in excluding faecal fluid, which is generally omitted from the anus after solid faecal matter, and which runs down from the anus along the animal's hide.

U.S. Pat. No. 3,270,714 discloses a similar device, which attempts to overcome some of the deficiencies of that of U.S. Pat. No. 3,036,553, by providing an outlet tube to the collection bag and tethering this tube between the legs of the animal to discharge forward of the animal. As a result, this device reduces to some extent unwanted lateral movement of the oval ring, but is only suitable for use with a stabled animal. The device of this patent, in other respects, shares the shortcomings of the device of U.S. Pat. No. 3,036,553.

It is an object of the present invention, therefore, to provide a urine collector for female quadrupeds which in use will resist dislodgment and reduce the risk of faecal contamination without undue discomfort to the animal.

Accordingly, the present invention provides a urine collector for collecting urine from a female quadruped, having:

a urine receptacle having a urine inlet for receiving urine;

a support member for supporting said receptacle, said support member locatable to bridge the buttocks of said quadruped adjacent to and below the vulva thereof and generally conforming to the shape of the rump of said quadruped to thereby resist lateral displacement;

wherein said receptacle is supported by said support member so that said urine inlet is proximate to and substantially surrounds the periphery of the urethra of said quadruped.

Thus, the urine collector of the present invention does not need to surround the entire vulva, or form an effective seal against the perineum, as it employs a receptacle located around the urethra itself, and therefore at a greater distance from the anus than in prior art devices such as those of the above mentioned U.S. patents. Faeces are deflected by the top of the receptacle, and—as the support member carries the weight of the receptacle remote from the vulva—the receptacle will exert little if any pressure on the vulva. The urine collector may be attached to the quadruped by any suitable known means, such as a suitable harness, such that the urine collector—including most importantly the support member—is located in the desired position.

Further, the vulva of the quadruped is used as a natural barrier to deflect manure over the top of the urine receptacle or chamber which itself is minimised in size as it is only required to surround the urethra and not the entire vulva.

Preferably the urine collector includes first and second flexible panels for locating against the respective buttocks of the quadruped and attached to said receptacle, to further restrict unwanted movement of said receptacle and to aid the locating of said receptacle adjacent to said urethra. The firsthand second panels may be integral with each other.

Preferably said receptacle is of a flexible construction.

Thus, it is desirable that the receptacle be of a flexible material to reduce the risk of injury to the quadruped.

Urine may be accumulated in the receptacle, but preferably the urine collector includes a reservoir and the receptacle includes a urine outlet in fluid communication with the reservoir.

Thus, the receptacle will not have to bear the weight of the urine and may be compact in size.

Preferably said urine outlet is provided in a lower wall of said receptacle.

Preferably said receptacle is located by said support member to leave a passage between that portion of said receptacle below said urine inlet on the one hand and said support member and said vulva on the other hand, to allow the passage of faecal fluid flowing down the hide of said quadruped.

Thus, as faecal fluid will flow down the rump of the quadruped rather than be projected rearwardly, a small passage between the support member will allow this faecal fluid (which may contain some faecal solids) to pass and prevent its build up. The passage should be sufficiently large that faecal fluid is substantially prevented from entering the receptacle, but not so large that urine is lost as it crosses the resulting gap between the urethra and fluid inlet. Preferably, therefore, this gap is between 2 cm and 4 cm, and more preferably about 3 cm. That portion of the receptacle above the fluid inlet, however, should remain adjacent to the vulva so that faecal matter is prevented from entering the receptacle, as discussed above.

Providing this passage may lead to the loss of a small volume of urine, but the significance of the loss of volume will be greatly outweighed by the preservation of the purity of the collected urine.

The receptacle preferably has a top portion comprising a roof for inhibiting falling faecal matter from entering said receptacle. Preferably said roof has an underside provided with a ridge to encourage faecal fluid to detach from said underside and thereby not flow into said inlet, and/or to direct flow of faecal fluid away from said inlet.

Preferably said support member has a central portion that, in use, is lower relative to the urethra of said quadruped than are portions of said support member adjacent to said central portion.

Preferably said central portion is between 3 and 4 cm lower, and more preferably approximately 3.2 cm lower.

This is to reduce the likelihood of the flow of downwardly directed urine being partially interrupted by the support member. However, this central portion may not be the only central portion of the support means: the central portion may be a first central portion in use distal from the mare, and the support means may have a second central portion in use proximate to the mare at substantially the same height as the adjacent portions.

The present invention also provides a method of collecting urine from a female quadruped, involving:
  supporting a urine receptacle, having a urine inlet for receiving urine, so that said urine inlet is proximate to and substantially surrounds the periphery of the urethra of said quadruped.

Preferably said method includes supporting said urine receptacle by means of a support member locatable to bridge the buttocks of said quadruped adjacent to and below the vulva of said quadruped and generally conforming to the shape of the rump of said quadruped to resist lateral displacement therefrom.

Preferably the method includes locating said receptacle by means of said support member to leave a passage between that portion of said receptacle below said urine inlet on the one hand and said support member and said vulva on the other hand, to allow the passage of faecal fluid flowing down the hide of said quadruped.

Preferably said method includes inhibiting falling faecal matter from entering said receptacle by providing said receptacle with a top portion comprising a roof. Preferably said method includes providing said roof on an underside thereof with a ridge to encourage faecal fluid to detach from said underside and thereby not flow into said inlet and/or to direct flow of faecal fluid away from said inlet.

Preferred embodiments of the present invention will now be described, by way of example, with reference to the accompanying drawings in which.

Figure 1:
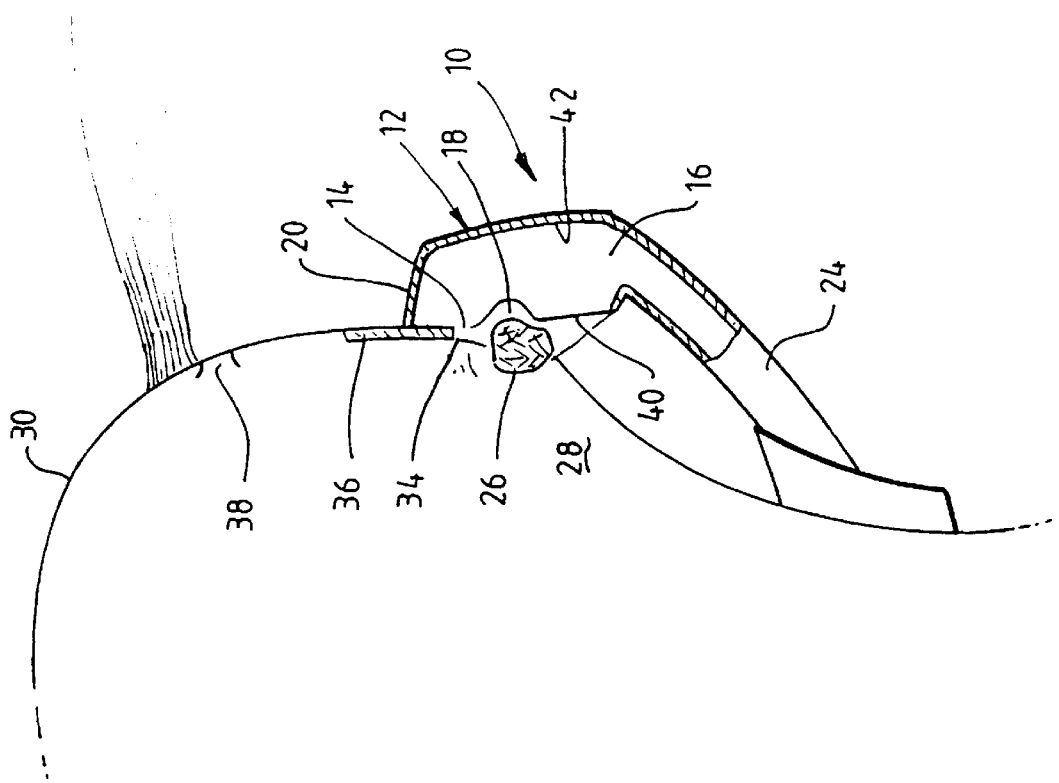
FIG. 1 is a schematic view of a urine collector for a mare, in simplified form, according to the preferred embodiment of the present invention and shown in use with the hindquarters of a mare.
Figure 1:
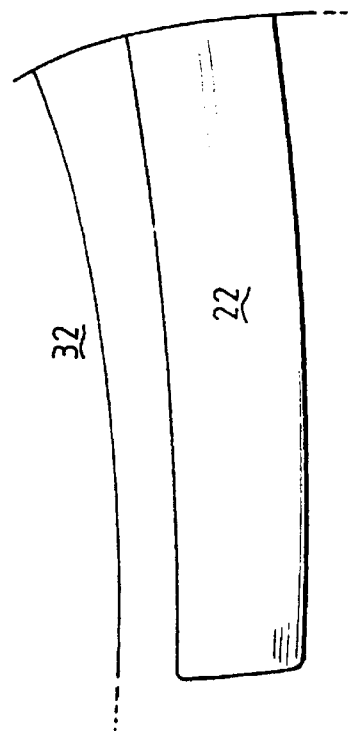

A simplified urine collector according to a preferred embodiment of the present invention is depicted, in use with a mare 30, at 10 in FIG. 1. Urine collector 10 includes a PVC receptacle 12 with a forward facing urine inlet 14 and a urine outlet 16.

In addition, the receptacle 12 has a roof or lid 20, to prevent (principally) faeces falling into the urine collector 10.

Urine collector 10 also includes a reservoir 22 connected to the receptacle 12 by means of tube 24, and a support means in the form of rigid rubber standoff member 26, conforming to the anatomy of the rump 28 of the mare 30, and from which the receptacle 12 is suspended.

Not shown in FIG. 1 is a fastening means or harness for locating rubber standoff 26 in position and supporting reservoir 22 under the belly 32 of the mare 30. This harness, however, can be of any suitable form, although a preferred form will be described in greater detail below (see FIG. 4).

The size of the receptacle 12 is such that the receptacle 12 extends above the rubber standoff 26 so that urine inlet 14 surrounds the urethra 34 of the mare 30. The receptacle 12, in particular, does not attempt to encircle the entire vulva 36. The roof 20 is provided so that faeces ejected from anus 38 are prevented from entering receptacle 12. Further, a passage 18 is left between portion of the receptacle 12 below the urine inlet 14 on the one hand and the standoff 26 and vulva 36 on the other hand, so that faecal fluid emitted from anus 38 may run down the mare and between the receptacle 12 and the standoff 26. Roof 20 of receptacle 12, however, preferably makes light contact with the vulva 36 so that falling faecal solids are excluded without causing discomfort to the mare 30. Urine ejected, typically with some force, from urethra 34 will cross the passage 18 and hit inside rear face 42 of receptacle 12 and be directed downwards into tube 24 to reservoir 22. Some urine, possibly ejected with less force, may be lost into the passage 18, but this will represent a small proportion of the total urine emitted and it is preferable that a small quantity of urine be lost than that the collected urine be contaminated by faecal fluid.

Figure 2:
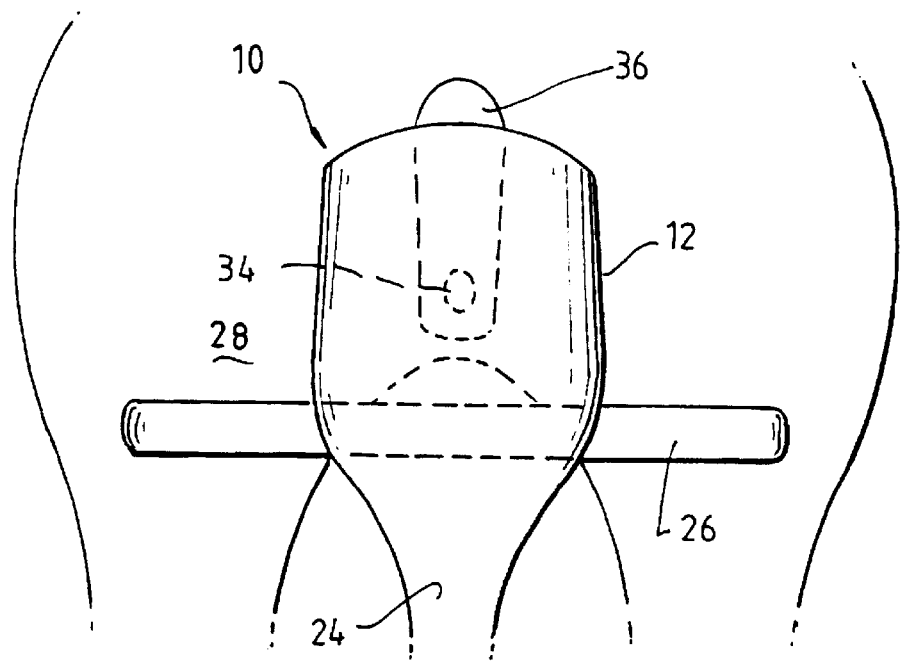
FIG. 2 is a view of the urine collector of FIG. 1, in use, from the rear of the mare.

FIG. 2 is a rear schematic view of a portion of the urine collector 10 of FIG. 1, showing the relative location of the rubber standoff 26, receptacle 1 and tube 24 of the urine collector with respect to the vulva 36 and urethra 34 of the mare 30. It should be understood that the rubber standoff 26 is indented towards its centre and ends to conform to the curve of the rump 28 of mare 30. The ends of the rubber standoff 26 thereby wrap around the rump 28 to some extent. The result is that rubber standoff 26 is shaped somewhat like the numeral "3", thereby strongly inhibiting any undesired lateral movement of the rubber standoff 26. The receptacle 12 is thus held securely about the urethra 34, without itself having to be pressed firmly against the rump 28 or vulva 36 of the mare 30. As discussed above, there will generally be some contact between the receptacle 12 and the mare 30 (by virtue of the roof 20), but the receptacle is constructed of a soft, flexible material so that any such contact does negligible or no harm to the mare 30.

Figure 3:
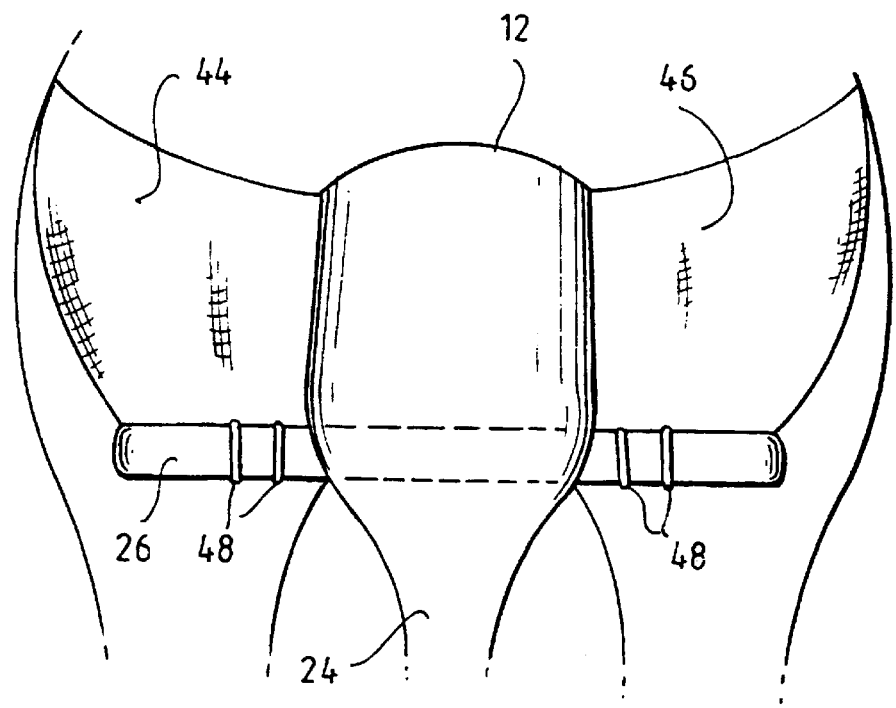
FIG. 3 is a detail of a preferred form of the urine collector of FIG. 1.

In a preferred form of the embodiment depicted FIG. 1, the urine collector includes a pair of flexible PVC panels, which cover the rump 28 of the mare 30 and are attached to both the rubber standoff 26 and the receptacle 12. These panels are represented in FIG. 3 at 44 and 46. The urine collector also includes straps 48 for attaching the PVC panels 44, 46 and the receptacle 12 to the rubber standoff 26. These PVC panels 44, 46, as they rest against the rump 28 of the mare 30, are constrained to conform to the shape of rump 28. Consequently, by attaching receptacle 12 to these PVC panels 44, 46, the receptacle 12 can be accurately located about the urethra 34 without making any significant contact with vulva 36 or rump 28 of the mare 30.

The combination, in use, of the rubber standoff 26 and PVC panels 44, 46, securely locates the receptacle 12 about the urethra 34, making as little contact as possible with the mare 30.

Figure 4:
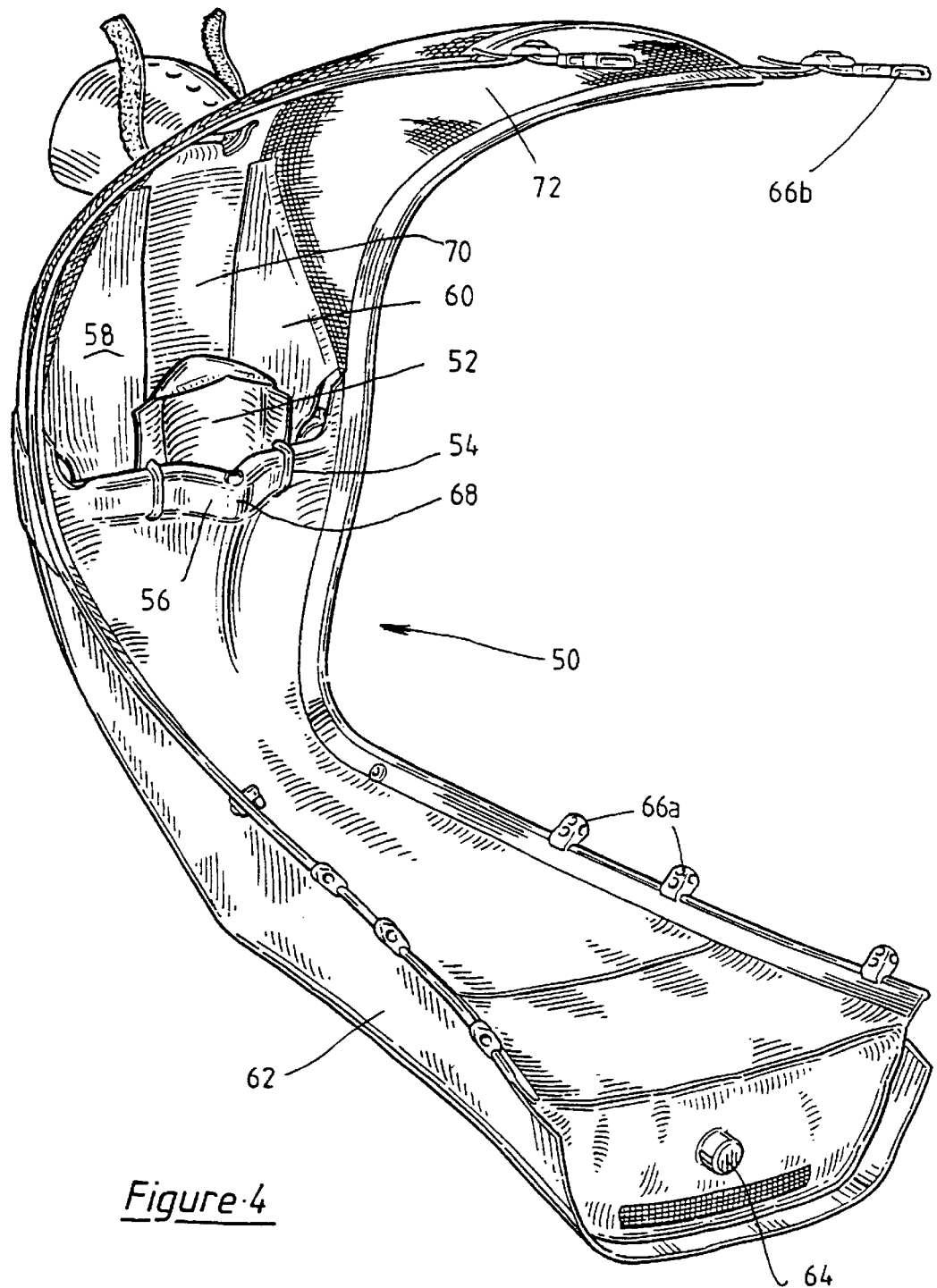
FIG. 4 is a perspective view of a urine collector according to another preferred embodiment of the present invention.

FIG. 4 is a more detailed, perspective view of a still further preferred urine collector 50, which is essentially a preferred form of urine collector 10. This figure clearly shows the urine receptacle 52 mounted, by means of straps 54, to rubber standoff 56. Flexible PVC panels 58 and 60 (as discussed above) are provided to ensure the correct locating of receptacle 52. Reservoir 62 includes a bladder (not shown) for accumulating urine, and in fluid communication by means of a tube (not shown) to the urine outlet (not shown) of receptacle 52. The reservoir 62 also includes an outlet port 64 for emptying the reservoir 62. Various fastening points 66a are provided at the upper side of reservoir 62, so that the urine collector 50 may be strapped to the mare. Similar fasteners 66b are provided in the upper section of the urine collector 50 for the same purpose.

The flexible panels of urine collector 50, as well as the other portions of the harness for maintaining the urine receptacle and rubber standoff 56 in position, may instead be made of diaphragm rubber (or nylon insertion rubber), comprising rubber sheet in which is imbedded a nylon web. Cold conditions favour the production of a higher concentration of the desired hormones in a mare's urine, and rubber is less vulnerable to becoming hard, brittle or uncomfortable when cold than is PVC.

This figure also clearly shows the indented or pointed central portion 68 of rubber standoff 56 which, in use, sits between the mares legs under the vulva. This pointed portion 68 correctly locates the rubber standoff 56 (and therefore the receptacle 52) by inhibiting sideways movement of the rubber standoff 56.

The urine collector 50 also includes a manure chamber 70, which is a simple shoot with an open lower end so that manure, ejected from the anus of the mare, can pass over and behind urine receptacle 52 and fall from the urine collector 50 under the ground (or into some receptacle, as desired).

In FIGS. 5 to 12, which are all alternative views of the urine collector 50 of FIG. 4, like numerals refer to like features.

Figure 5:
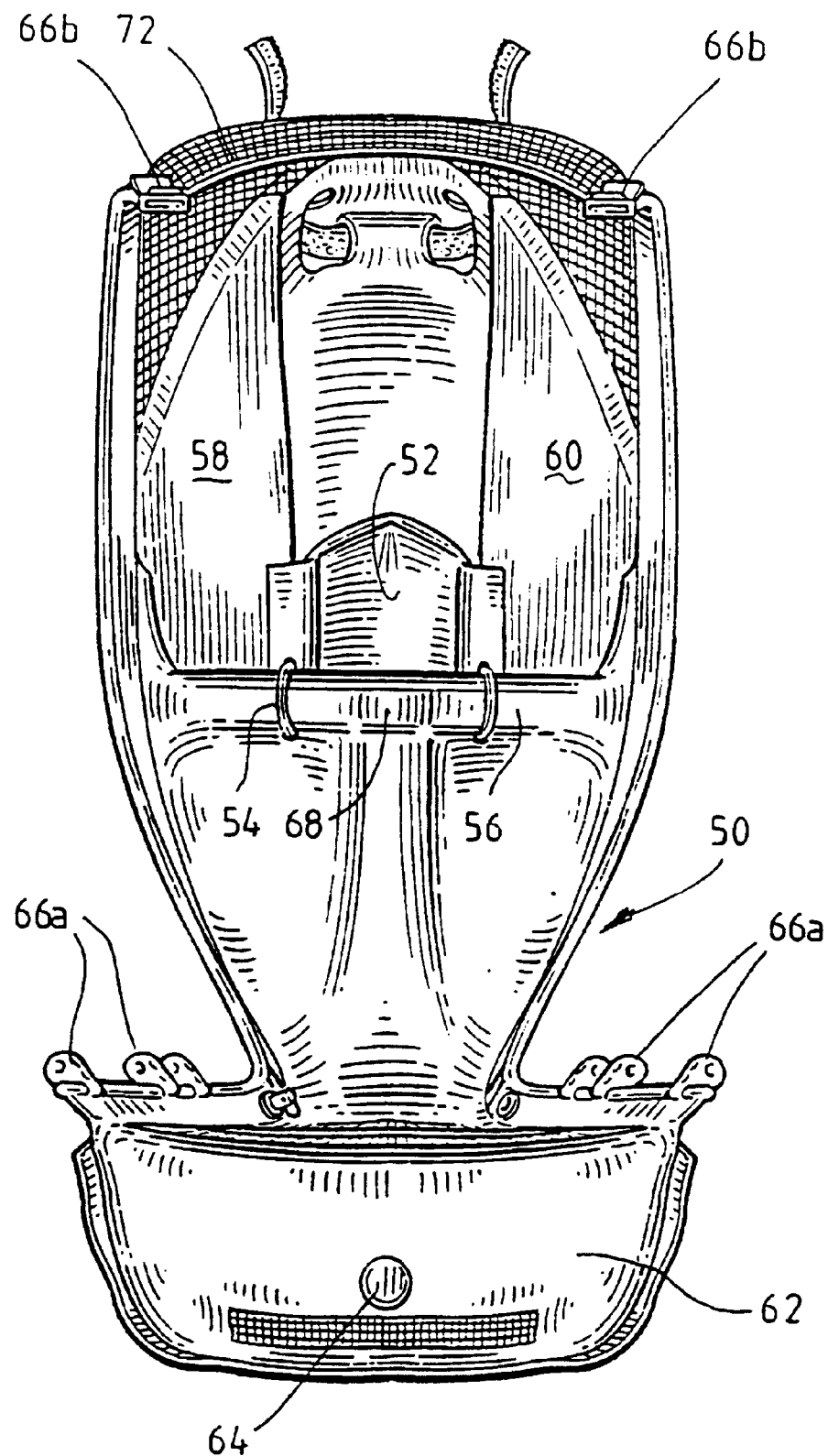
FIG. 5 is a front view of the urine collector of FIG. 4.

FIG. 5 is a front view of the urine collector 50 of FIG. 4. This figure more clearly depicts the upper portion 72 of the urine collector 50, which comprises an open weave fabric for locating above the tail of the mare and providing support for the urine collector 50.

Figure 6:
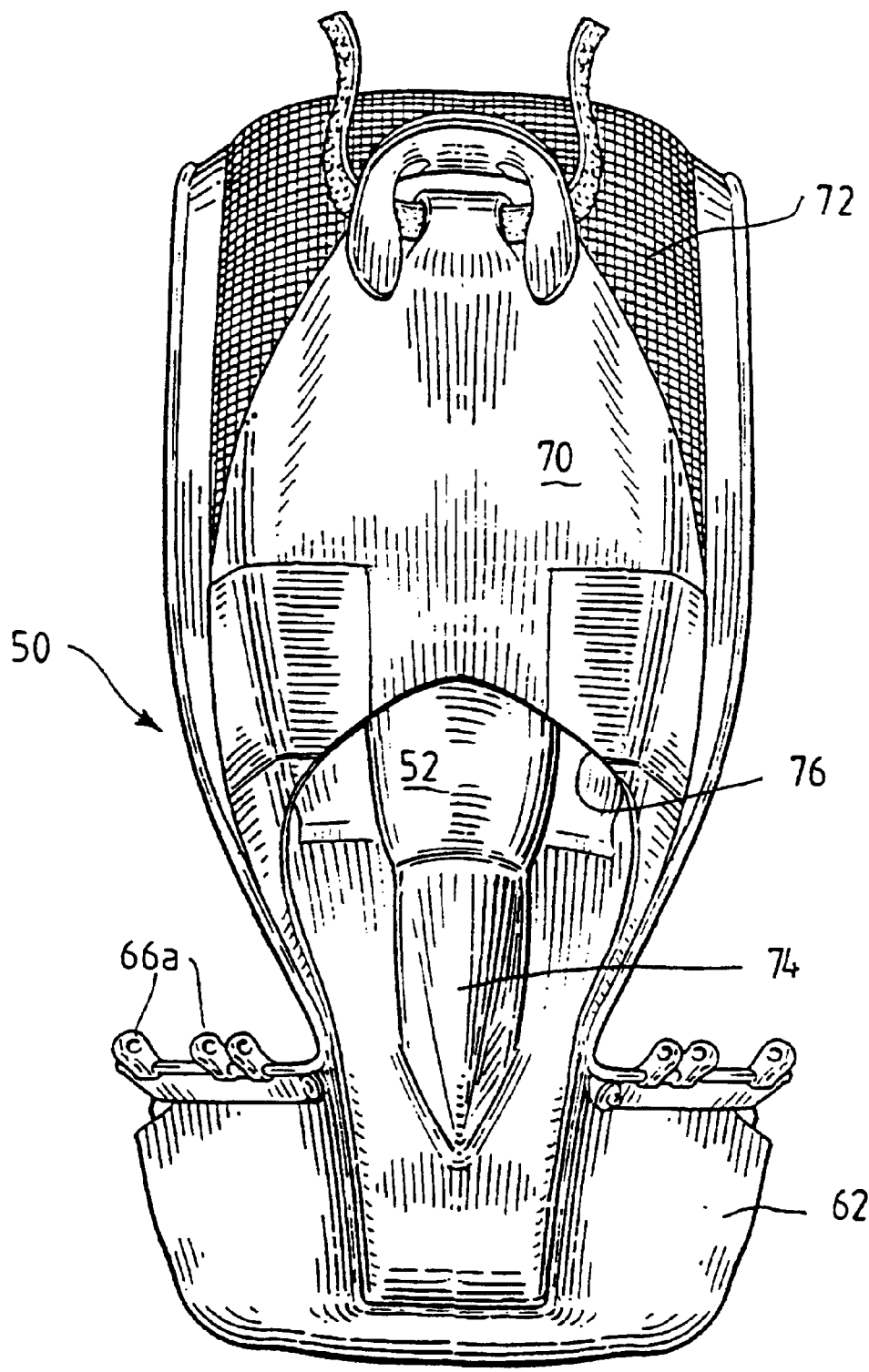
FIG. 6 is a rear view of the urine collector of FIG. 4.

FIG. 6 is a rear view of the urine collector 50 of FIG. 4. In this view, the tube 74 between the receptacle 52 and the reservoir 62 is shown, as well as the exit aperture 76 of the manure chamber 70.

Figure 7:
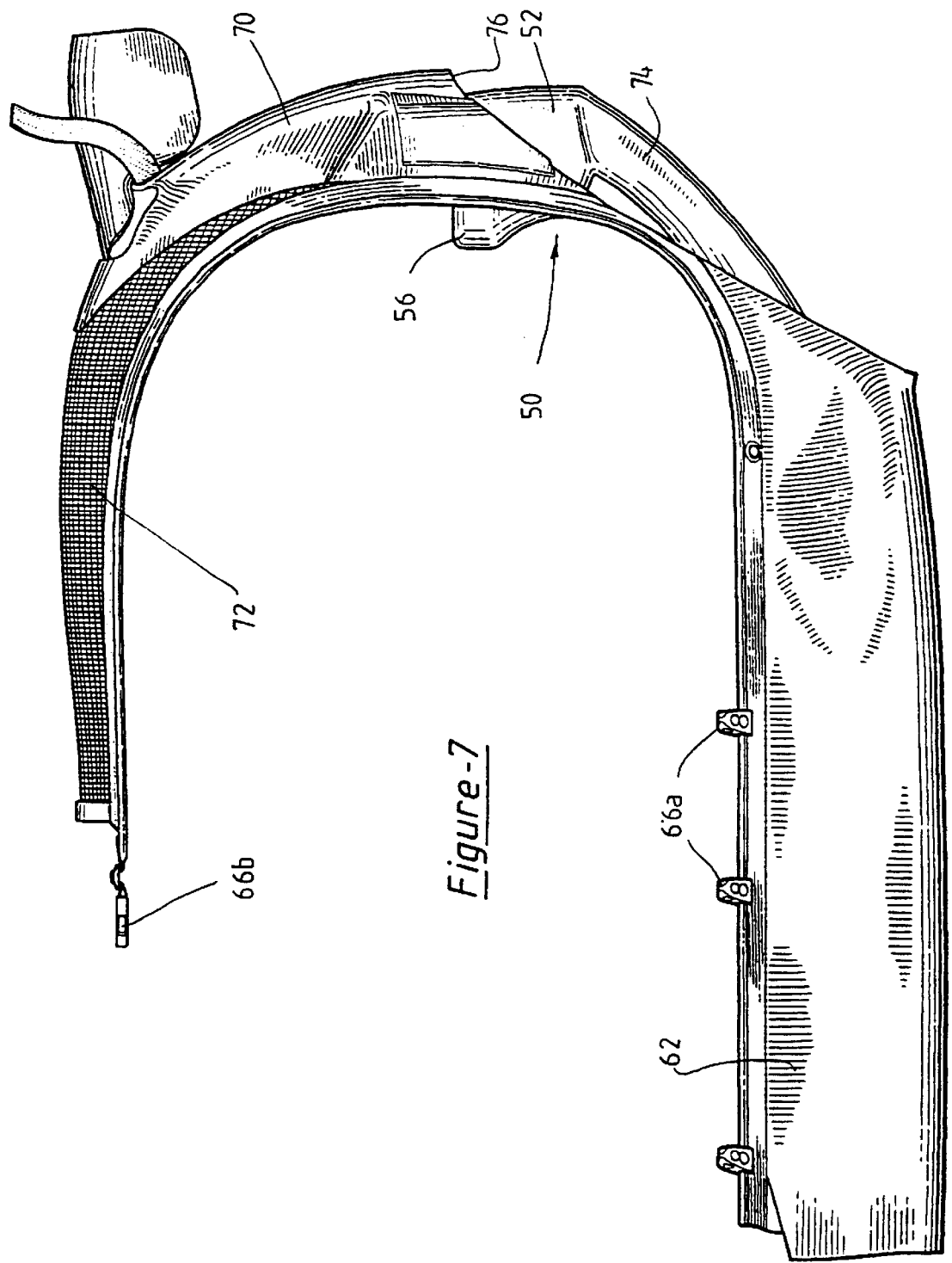
FIG. 7 is a side view of the urine collector of FIG. 4.
Figure 8:
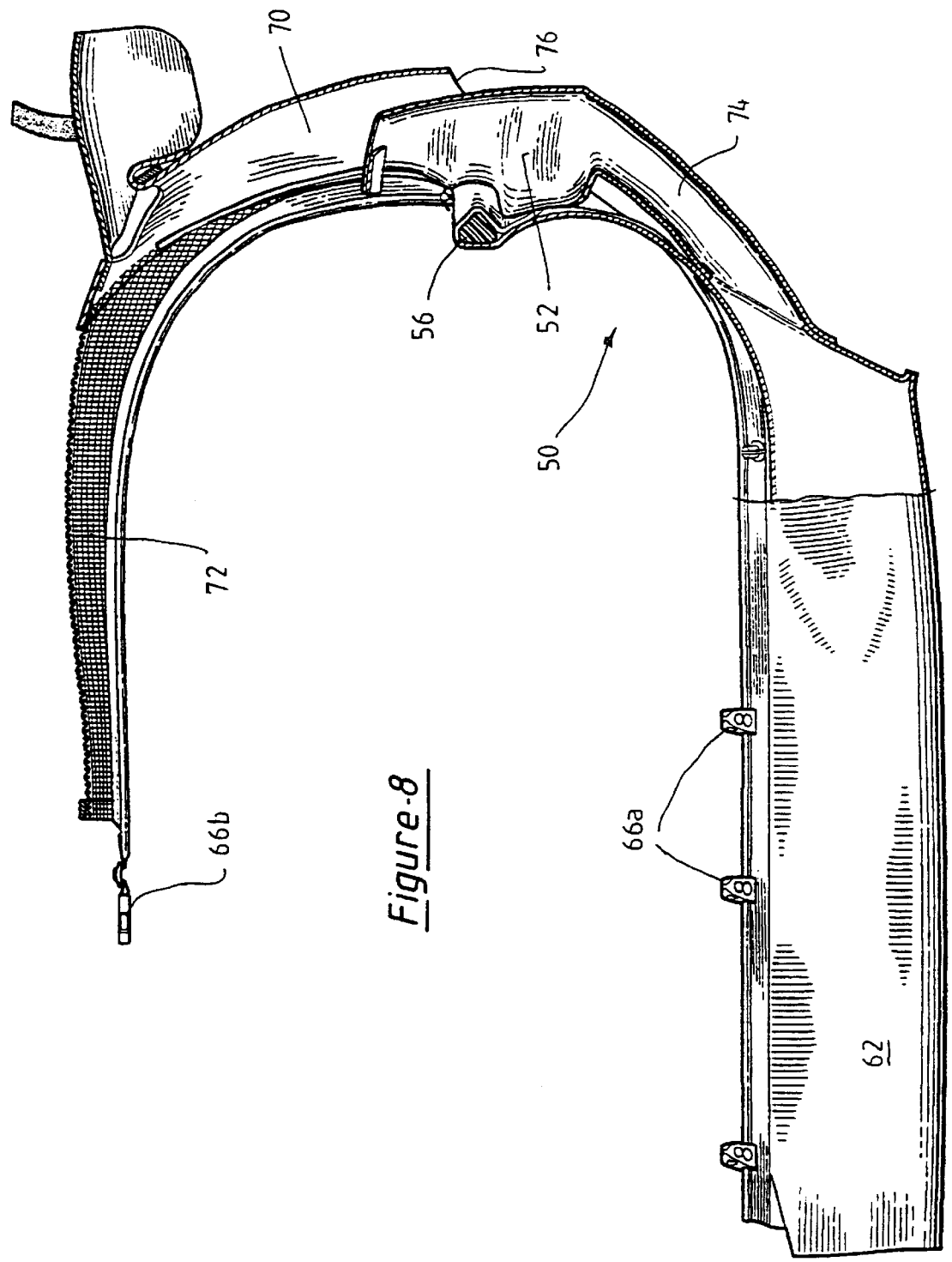
FIG. 8 is a view similar to that of FIG. 7, in partial cross-section.
Figure 9:
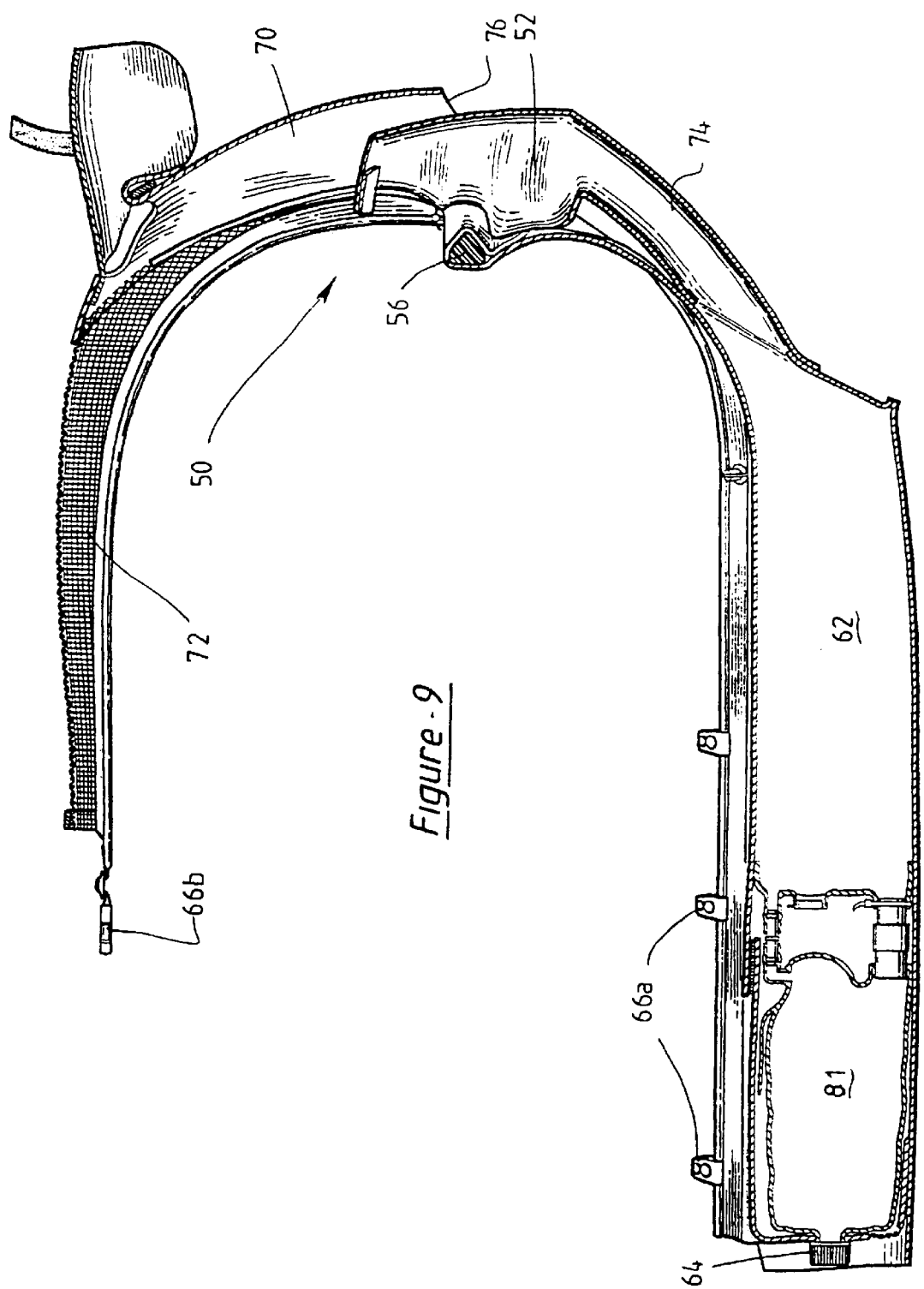
FIG. 9 is a view similar to that of FIG. 7 in full cross-section.

FIG. 7 is a side view of urine collector 50, while FIG. 8 is a partial cross-section of the view of FIG. 7, and FIG. 9 is a full cross-section of the view of FIG. 7, in which is shown bladder 81 in reservoir 62.

Figure 10:
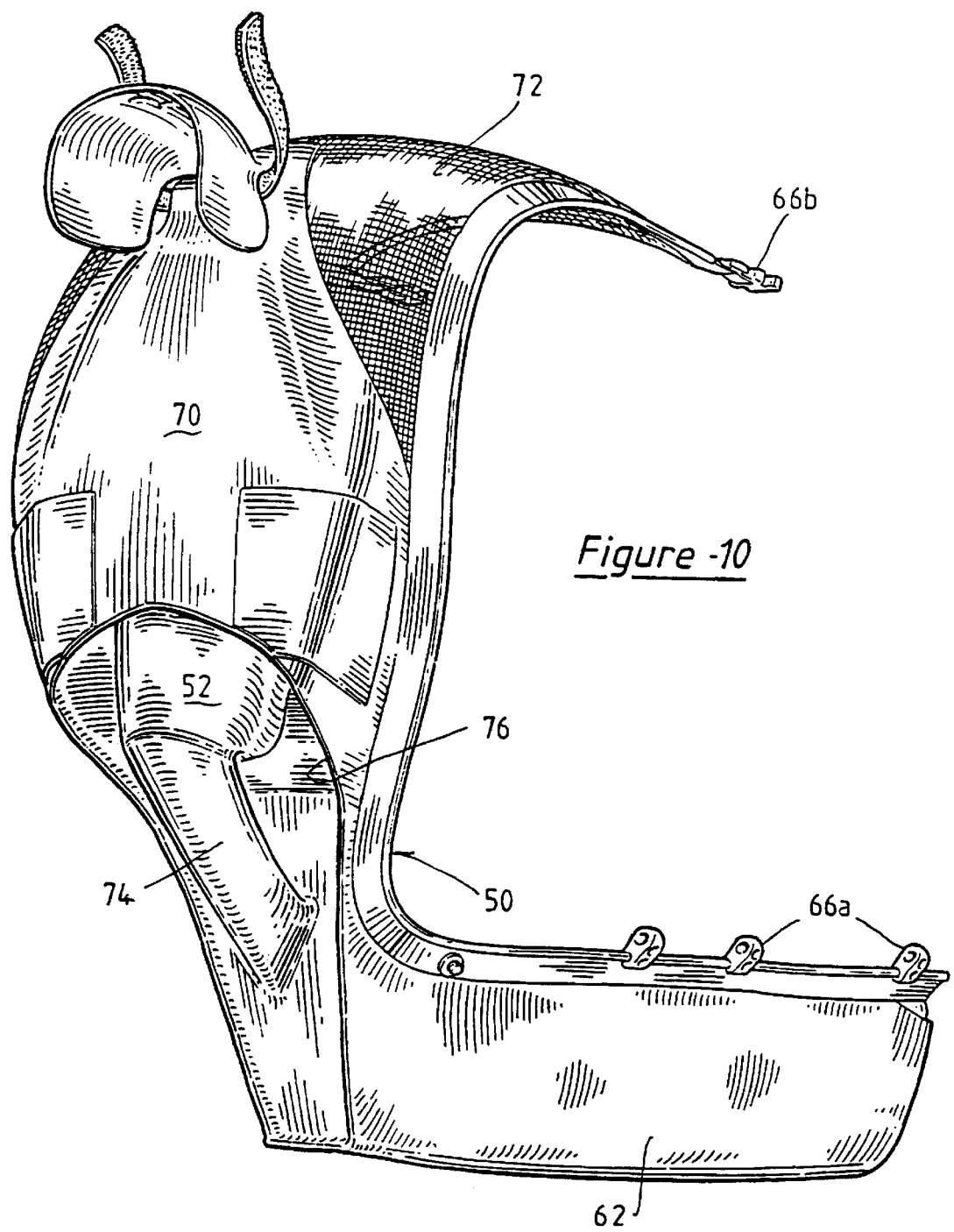
FIG. 10 is a rear/side perspective view of the urine collector of FIG. 4.
Figure 11:
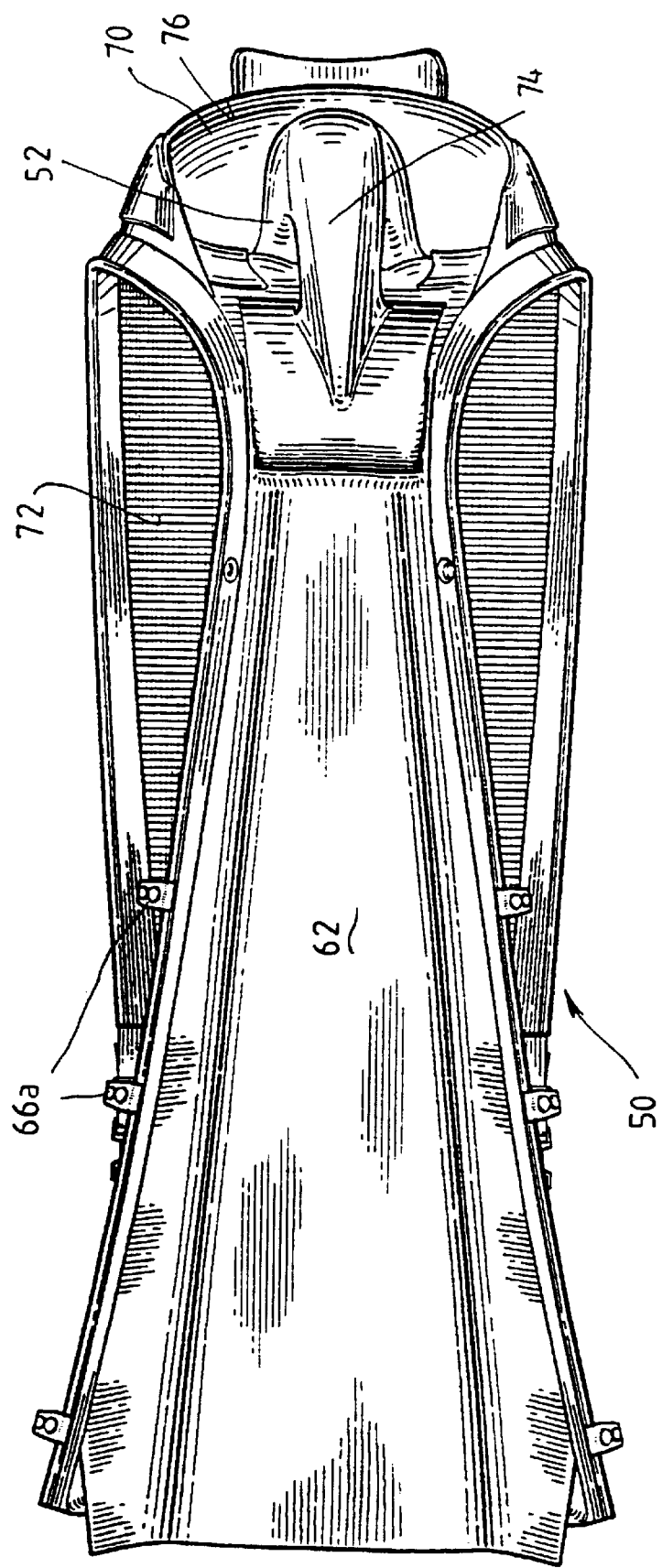
FIG. 11 is a bottom view of the urine collector of FIG. 4.
Figure 12:
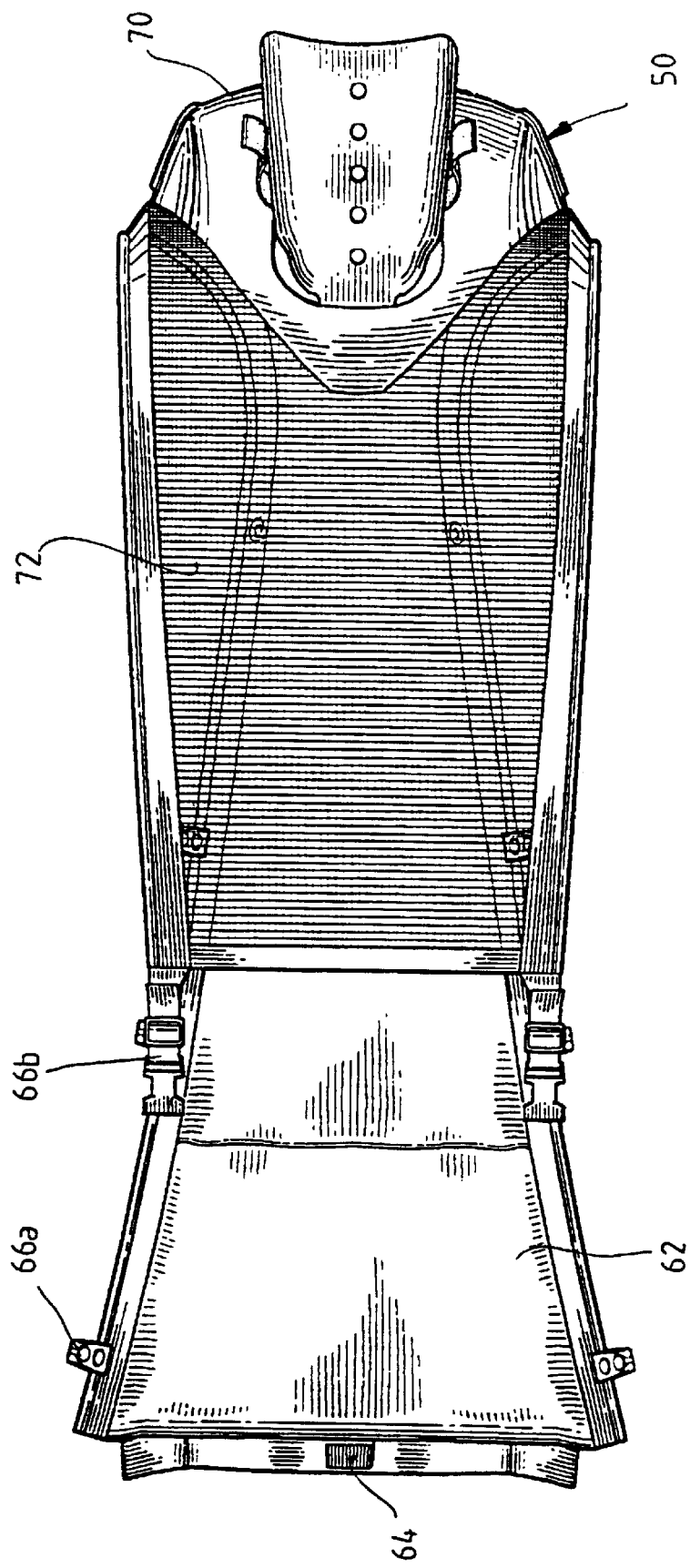
FIG. 12 is a top view of the urine collector of FIG. 4.

FIG. 10 is a rear/side perspective view of the urine collector 50, while FIGS. 11 and 12 are—respectively—bottom and top views of urine collector 50.

Figure 13:
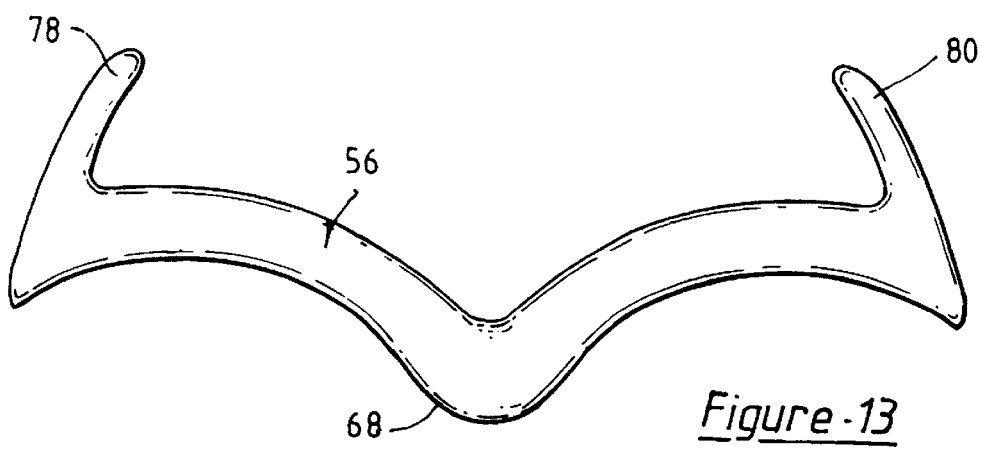
FIG. 13 is a top view of the standoff of the urine collector of FIG. 4.

Referring to FIG. 13, the rubber standoff 56 of the urine collector 50 is shown, from above, together with rearwardly projecting arms 78 and 80. The arms 78 and 80 hold open the manure chamber 70 so that it does not collapse under its own weight.

Figure 14:
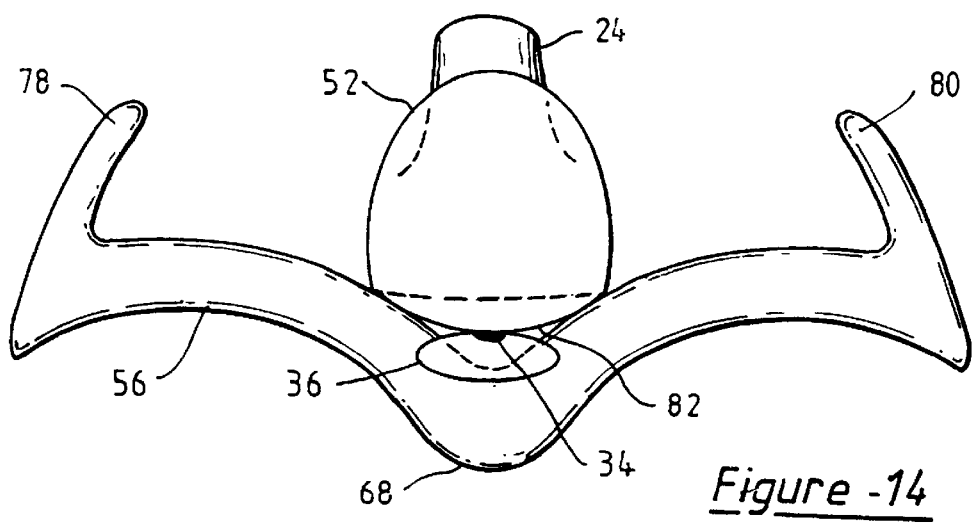
FIG. 14 is a top view of the standoff and receptacle of the urine collector of FIG. 4 in use.

FIG. 14 is a top view of rubber standoff 56 with receptacle 52, relative to the vulva 36 and urethra 34. It will be seen that vulva 36 actually overhangs part of the central section of rubber standoff 56, and that roof 82 of urine receptacle 52 just makes contact with vulva 36.

Figure 15:
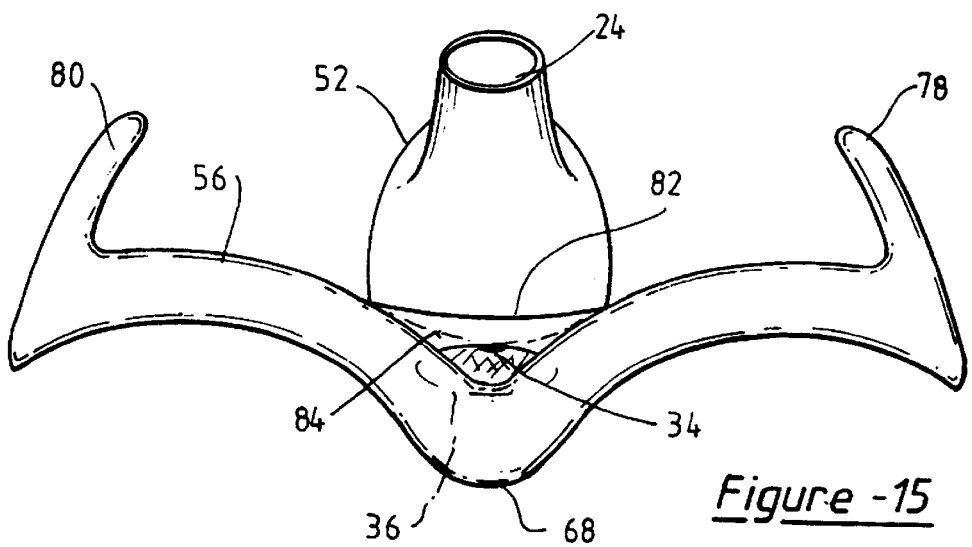
FIG. 15 is a bottom view of the standoff and receptacle of the urine collector of FIG. 4 in use.

FIG. 15 is a bottom view of rubber standoff 56 and receptacle 52 of urine collector 50, relative to vulva 36 and urethra 34. From underneath, the vulva 36 is partially obscured by the rubber standoff 56. Roof 82 projects to the vulva 36, but it will be seen that a passage 84 is left between the main body of urine receptacle 52 and the vulva 36 to allow faecal fluid to escape. This faecal fluid can pass roof 82 owing to the fact that roof 82 does not form a firm seal with or exert great pressure against vulva 36. Such fluid can flow down passage 84 and escape.

A percentage of mares have a urine stream that is close to vertically downwards. Some mares will squat particularly low to avoid urine splashing on them owing to, for example, high winds, which can also cause the urine stream to be closer to the vertical. Such a urine stream may hit the rubber standoff (or cross member) 56, and be deflected thereby out of the collector. Thus, an unbroken flow of urine may not enter the urine receptacle 52.

One solution might be to lower the standoff 56 to avoid the urine stream, but the urine collector will then move backwards as the mare squats, and the rubber standoff 56 nonetheless move into the urine stream. For this reason, in fact, it is generally important that the rubber standoff 56 be close to the vulva 36 and urethra 34 so that there is minimal backward movement of the standoff 56.

Thus, it may be preferably to configure the rubber standoff 56 to accommodate such downward urination. This can be done by lowering or thinning the central portion 68 of the standoff 56 on its concave, rearward facing side, and thereby introducing a greater gap between the urethra 34 and the standoff 56. This can be done either by stepping the standoff 56 at the upper, rearward edge of the central portion 68, or forming the two lateral halves of the standoff 56 with a central gap, the two halves joined with a lowered central portion 68. In either case, the top of the central portion 68 closest to the urethra 34 is lowered, preferably by about 3 to 4 cm and, in one preferred embodiment, by 3.2 cm.

This adjustment increases the likelihood that downward urination will avoid the rubber standoff 56.

Figure 16:
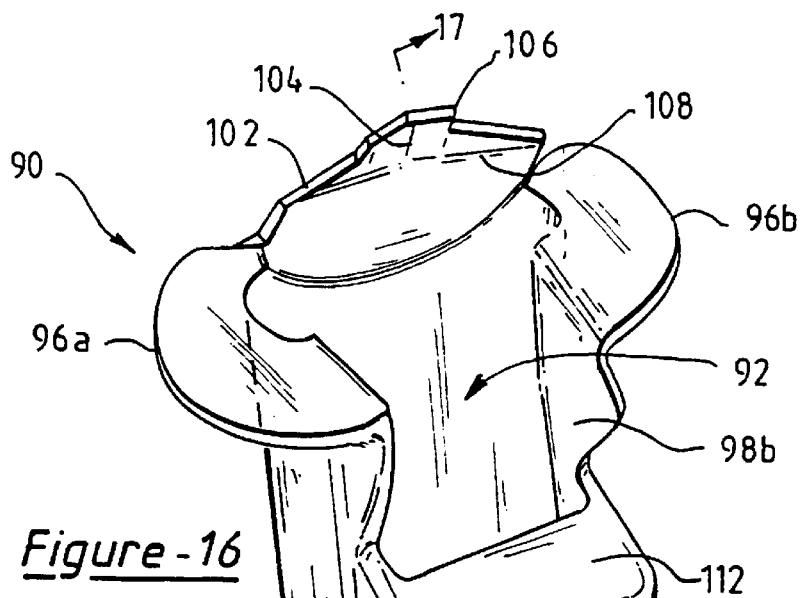
FIG. 16 is a perspective view of a urine receptacle according to another preferred embodiment of the present invention.

FIG. 16 is a perspective view of a rubber urine receptacle 90 according to another preferred embodiment of the present invention. Urine receptacle 90 is comparable to urine receptacle 52 of urine collector 50 (see FIG. 4), but includes a number of further refinements.

Receptacle 90 is integrally moulded in soft rubber so that, where it is in contact with the rump of a mare, little if any rubbing or chaffing will occur. The receptacle 90 has a urine inlet 92 and a urine outlet 94 (to which urine is constrained to flow by receptacle 90 after the urine has entered inlet 92). Urine that enters inlet 92 flows towards outlet 94 and from there along suitable tubing to a reservoir (as described above).

Receptacle 90 is provided with laterally extending wings 96a and 96b disposed either side of inlet 92 to distribute any pressure that may, in use, be exerted by the receptacle 90 against the mare's rump.

Thus, to this point receptacle 90 resembles receptacle 52 of FIG. 4, and operates according to the invention when inlet 92 is disposed about the mare's vulva in the manner described above.

Figure 17:
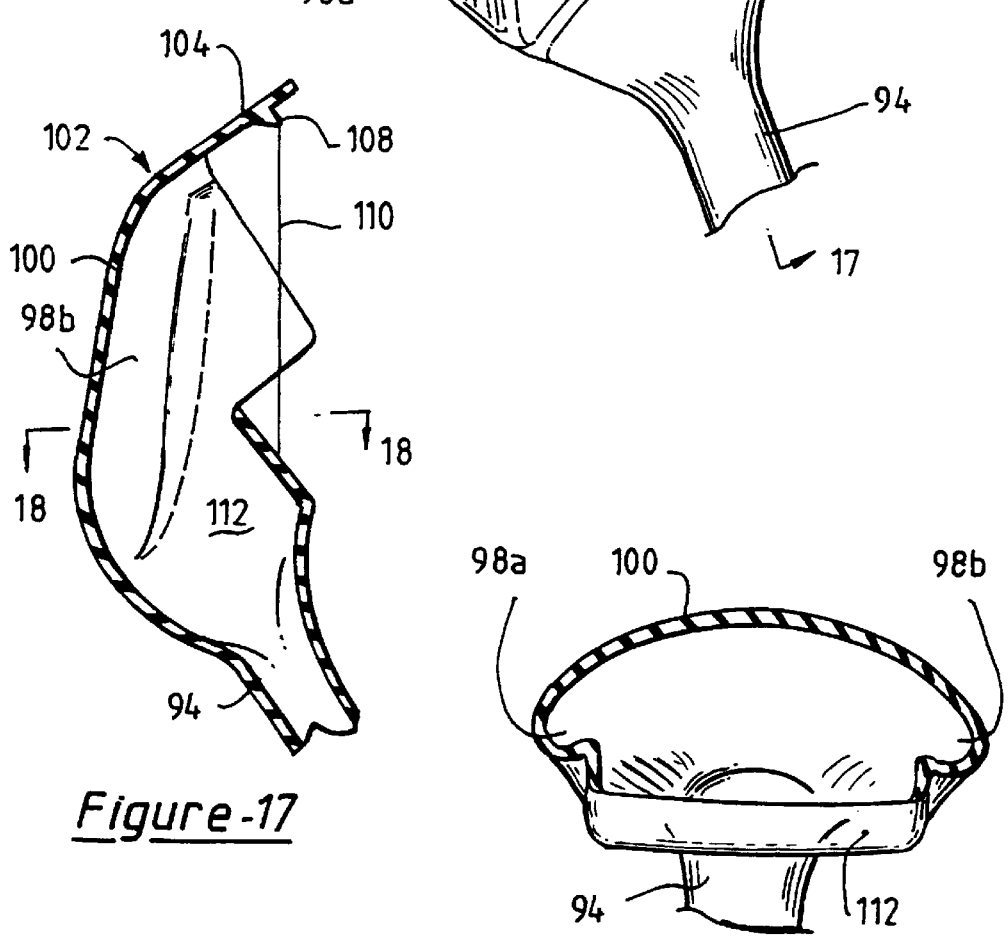
FIG. 17 is a cross section through 17—17 in FIG. 16, of the urine receptacle of FIG. 16.
Figure 18:
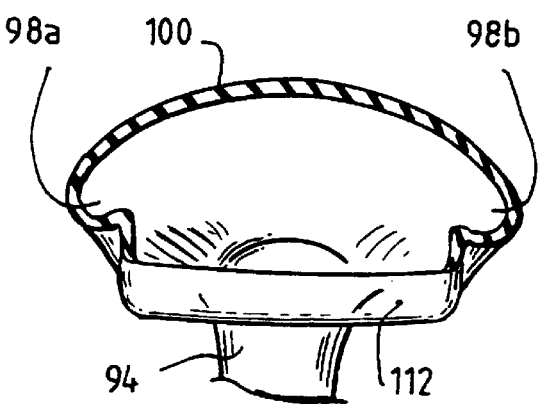
FIG. 18 is a cross section through 18—18 in FIG. 17, of the urine receptacle of FIG. 16.

However, urine discharged by the mare may enter inlet 92 and thereby receptacle 90 with considerable velocity. In order to minimize the risk of the urine splashing out of receptacle 90 (rather than flowing towards outlet 94), receptacle 90 has side walls 98a and 98b that distend outwardly, forming vertically elongate channels concave to the interior of receptacle 90. The channel formed by concave side wall 98b is also shown in FIG. 17, which is a cross sectional view through 17—17 in FIG. 16 of receptacle 90. Referring to FIG. 18, when receptacle 90 is viewed in cross section through 18—18 in FIG. 17, the concave nature of these channels formed by side walls 98a and 98b becomes still more readily apparent. Indeed, these channels face somewhat rearwardly towards rear wall 100 of receptacle 90 so that urine deflected sideways into these channels will tend to splash towards rear wall 100 rather than towards inlet 92 (from which it might undesirably escape).

Receptacle 90 includes a roof 102 (comparable to roof 82 of receptacle 52) that is integral with rear wall 100 and, to a lesser extent, side walls 98a and 98b. Roof 102 can extend towards the mare's rump as far as possible without actually touching the rump, to exclude as faecal matter (solid and liquid) as possible. Being of soft rubber, any inadvertent contact between roof 102 and the mare's rump should lead to little if any injury to the mare. Thus, it is acceptable to extend roof 102 closer to the mare's rump than might otherwise be possible if contact of any kind were intolerable (if, for example, the urine receptacle were of a harder or more abrasive material). However, owing to the softness of roof 102, there may be a tendency for roof 102 to sag or otherwise become distorted, and consequently function less efficiently at excluding faecal matter. Accordingly, roof 102 is most desirably formed with a strengthening ridge 104 along its mid-plane (coinciding with cross sectional plane 17—17 in FIG. 16).

Roof 102 also includes a central extension 106, which projects forwardly towards, in use, the mare's rump and somewhat between the mare's buttocks. This further optimizes the extent to which faecal matter is excluded from the receptacle 90.

As discussed above, however, a certain quantity of faecal fluid emitted from the anus may run over the mare's rump and, potentially, enter inlet 92 of receptacle 90. Owing to the proximity with which projection 106 can be located to the mare, some of this faecal fluid may flow from the mare onto roof 102 of the receptacle 90 and, flowing along the underside of roof 102, enter receptacle 90. Accordingly, roof 102 is provided with an elongate, transversely disposed integral ridge 108 on the underside of roof 102. Ridge 108 serves two functions: faecal fluid reaching ridge 108 will be encouraged to detach itself from roof 102 and, rather than flowing into inlet 92, fall past inlet 92. This is more clearly apparent in FIG. 17, in which plumb-line 110 illustrates the trajectory of faecal fluid falling from ridge 108 onto the outside face of forward wall 112. Such faecal fluid will then flow over the outside surface of the receptacle 90, away from inlet 92 and so not be collected.

In addition, ridge 108 may, in some embodiments, be formed in two lateral portions meeting at an obtuse angle in an inverted, broad "V" at the mid-line of roof 102. Faecal fluid will thereby be encouraged to flow away from this mid-line so that, if the faecal fluid does not become detached from roof 102 by means of ridge 108, it may nevertheless still be excluded from collection by ultimately falling to one side of inlet 92 or passing back to the mare's rump owing to contact between the mare's rump and roof 102.

Modifications within the spirit and scope of the invention may be readily effected by a person skilled in the art, and it is to be understood that this invention is not limited to the particular embodiments described by way of example hereinabove.

What is claimed is:

1. A urine collector for collecting urine from a female quadruped, having:

a urine receptacle having a urine inlet for receiving urine;

a support member for supporting said receptacle, said support member locatable to bridge the buttocks of said quadruped adjacent to and below the vulva thereof and generally conforming to the shape of the rump of said quadruped to thereby resist lateral displacement;

wherein said receptacle is supported by said support member so that said urine inlet is proximate to and substantially surrounds the periphery of the urethra of said quadruped.

2. A urine collector as claimed in claim 1, including first and second flexible panels for locating against the respective buttocks of the quadruped and attached to said receptacle, to further restrict unwanted movement of said receptacle and to aid the locating of said receptacle adjacent to said urethra.

3. A urine collector as claimed in claim 1, wherein said receptacle is of a flexible construction.

4. A urine collector as claimed in claim 1, including a reservoir wherein said receptacle includes a urine outlet in fluid communication with said reservoir.

5. A urine collector as claimed in claim 4, wherein said urine outlet is provided in a lower wall of said receptacle.

6. A urine collector as claimed in claim 1, wherein said receptacle is located by said support member to leave a passage between (a) that portion of said receptacle below said urine inlet and (b) said support member, and between (c) that portion of said receptacle below said urine inlet and (d) said vulva, to allow the passage of fecal fluid flowing down the hide of said quadruped.

7. A urine collector as claimed in claim 6, wherein said passage is sufficiently large that fecal fluid is substantially prevented from entering the receptacle, but not so large that urine is lost as it crosses a gap between said urethra and said fluid inlet.

8. A urine collector as claimed in claim 7, wherein said gap is between 2 cm and 4 cm.

9. A urine collector as claimed in claim 1, wherein said receptacle has a top portion comprising a roof for inhibiting falling fecal matter from entering said receptacle.

10. A urine collector as claimed in claim 9, wherein said roof has an underside provided with a ridge to encourage fecal fluid to detach from said underside and thereby not flow into said inlet, and/or to direct flow of fecal fluid away from said inlet.

11. A urine collector as claimed in claim 1, wherein said support member has a central portion that, in use, is lower relative to the urethra of said quadruped than are portions of said support member adjacent to said central portion.

12. A urine collector as claimed in claim 11, wherein said central portion is approximately 3.2 cm lower.

13. A method of collecting urine from a female quadruped, involving:

supporting a urine receptacle, having a urine inlet for receiving urine, so that said urine inlet is proximate to and substantially surrounds the periphery of the urethra of said quadruped, including supporting said urine receptacle by means of a support member locatable to bridge the buttocks of said quadruped adjacent to and below the vulva of said quadruped and generally conforming to the shape of the rump of said quadruped to resist lateral displacement therefrom.

14. A method as claimed in claim 13, including locating said receptacle by means of said support member to leave a passage between (a) that portion of said receptacle below said urine inlet and (b) said support member, and between (c) that portion of said receptacle below said urine inlet and (d) said vulva, to allow the passage of fecal fluid flowing down the hide of said quadruped.

15. A method of collecting urine from a female quadruped, involving:

supporting a urine receptacle, having a urine inlet for receiving urine, so that said urine inlet is proximate to and substantially surrounds the periphery of the urethra of said quadruped, including inhibiting falling fecal matter from entering said receptacle by providing said receptacle with a top portion comprising a roof.

16. A method as claimed in claim 15, including providing said roof on an underside thereof with a ridge to encourage fecal fluid to detach from said underside and thereby not flow into said inlet and/or to direct flow of fecal fluid away from said inlet.

* * * * *